April 12, 1966  K. BOFINGER  3,245,370
APPARATUS FOR MANUFACTURING END CLOSURES
Filed Sept. 11, 1963  8 Sheets-Sheet 1

FIG.1

INVENTOR.
KARL BOFINGER
BY Donald A. Karl
ATTORNEY

April 12, 1966 K. BOFINGER 3,245,370
APPARATUS FOR MANUFACTURING END CLOSURES
Filed Sept. 11, 1963 8 Sheets-Sheet 2

INVENTOR.
KARL BOFINGER
BY Donald A. Kaul
ATTORNEY

INVENTOR.
KARL BOFINGER
BY Donald A. Kaul
ATTORNEY

April 12, 1966 K. BOFINGER 3,245,370
APPARATUS FOR MANUFACTURING END CLOSURES
Filed Sept. 11, 1963 8 Sheets-Sheet 5

INVENTOR.
KARL BOFINGER
BY Donald A. Kaul
ATTORNEY

April 12, 1966 K. BOFINGER 3,245,370
APPARATUS FOR MANUFACTURING END CLOSURES
Filed Sept. 11, 1963 8 Sheets-Sheet 6

INVENTOR.
KARL BOFINGER
BY
Donald A. Karl
ATTORNEY

April 12, 1966  K. BOFINGER  3,245,370
APPARATUS FOR MANUFACTURING END CLOSURES
Filed Sept. 11, 1963  8 Sheets-Sheet 7

INVENTOR.
KARL BOFINGER
BY
ATTORNEY

FIG. 19

INVENTOR.
KARL BOFINGER

United States Patent Office 3,245,370
Patented Apr. 12, 1966

3,245,370
APPARATUS FOR MANUFACTURING END CLOSURES
Karl Bofinger, Barrington, Ill., assignor to American Can Company, New York, N.Y., a corporation of New Jersey
Filed Sept. 11, 1963, Ser. No. 308,114
27 Claims. (Cl. 113—1)

This invention relates to end closures and more particularly it relates to an apparatus for manufacturing such end closures.

End closures, and particularly those adapted for use on hermetically sealed containers or cans, must be strong enough to withstand shocks and forces occasioned by pressurizing or vacuumizing of the container and also occasioned by normal shipping and handling procedures; yet must be of such a design that they can be easily opened by a consumer to permit removal of the container contents. In recent years, the "easy open" type of end closure has received wide consumer acceptance because it permits opening of the container without the use of the conventional form of can openers. Generally, these "easy open" ends have been provided with an integral tear strip which, when pulled or wound, severs a portion of the end to form a dispensing opening through which the contents of the container may be removed.

The conventional form of these "easy open" ends in the past has required the utilization of a separate key or other tool for removal of the tear strip. In such configurations, it is necessary to either provide a free end on the tear strip which can be engaged by the key, or to provide a means for permanently attaching the key or other suitable gripping member to the tear strip while simultaneously producing a hermetically sealed end. In the manufacture of end closures having a tear strip with a permanently attached key or tool, it is necessary to first manufacture or purchase the key or tool and to then weld or otherwise suitably secure such a key or tool to an end of the tear strip. This operation requires that the key or tool be specially positioned in predetermined alignment with the tear strip end and, while such special positioning can be accomplished, it necessarily increases the cost and the time of manufacture of the end as well as requiring additional machinery and special equipment for aligning and assembling the end and the key or tool.

Recently an easy open end closure has been invented which utilizes an integral tear strip which can be removed without the use of a key or other opening tool. This end closure is described in United States patent application, Serial No. 182,751 filed March 27, 1962 in the name of H. E. Wilkinson, now U.S. Patent 3,182,852. It accomplishes its unique opening feature by forming a finger engageable tab which is severed from the central panel of an end closure and which acts as the leading end of a tear strip which is integral with and substantially circumscribes the end closure central panel. When the tab is manually pulled, the tear strip is torn out of the end closure thus separating the central panel from the end and thereby providing a dispensing opening in its stead. That portion of the end closure from which the tab is severed is hermetically sealed by a seal patch of suitable material which has sufficient strength to withstand the forces encountered during processing, shipping and handling of the container to which the end closure is applied. There is no particular orientation of the pull tab within the end closure central panel and thus it is unnecessary to have any special positioning or alignment of the end as it is transferred into the machine which manufactures it.

An object of the present invention is to provide an apparatus for manufacturing the above-described end closure.

A further object of this invention is to provide an apparatus for manufacturing end closures having integral tear strips and pull tabs formed therewithin, and in which no special orientation of the end closures is needed as they are introduced into the manufacturing apparatus.

A still further object of this invention is to provide a fully automatic production apparatus which receives imperforate end closures, produces therein manually operable tear strip opening means, and then discharges the completed end closures.

Yet another object of this invention is to provide an apparatus for manufacturing a container end closure wherein a finger engageable tab and its associated tear strip are formed from the central panel of the closure and wherein such an end closure can be easily and inexpensively manufactured at a high rate of production.

Numerous other objects and advantages of the invention will be apparent as it is better understood from the following description, which, taken in connection with the accompanying drawings, discloses a preferred embodiment thereof.

The foregoing objects are attained by providing a device which includes a pair of counter-rotating turrets which overlap slightly at one portion of their peripheries. Each turret has a plurality of spaced apertures and the apertures of one turret coaxially align with those of the other turret in the region of overlap. Imperforate end closures are supplied into the apertures of the upper turret and are retained therein by selectively operable engagement jaws. As the upper turret indexes or rotates, a tab is pierced out of the central panel of the end closure and a pair of score lines are formed from the fixed end of the tab around the circumference of the central panel. As the end closure with the tab and tear strip formed therein is moved into the region of overlap, the upper or overlying turret jaws release the end and allow it to drop into the lower or underlying turret wherein another set of jaws are operated to retain the end in the aperture.

As the lower turret indexes or rotates, the end is heated and a seal patch is severed from a source thereof and applied to the underside of the central panel beneath the pierced out tab. A slight bumping pressure is applied to affix the patch thereto. Subsequently, the end and the patch affixed thereto are again heated and a severe bumping pressure is applied to firmly seal the patch to the end. The completed end is then discharged from the turret. The foregoing operation is continuously and fully automatic.

Referring to the drawings.

Figure 1:
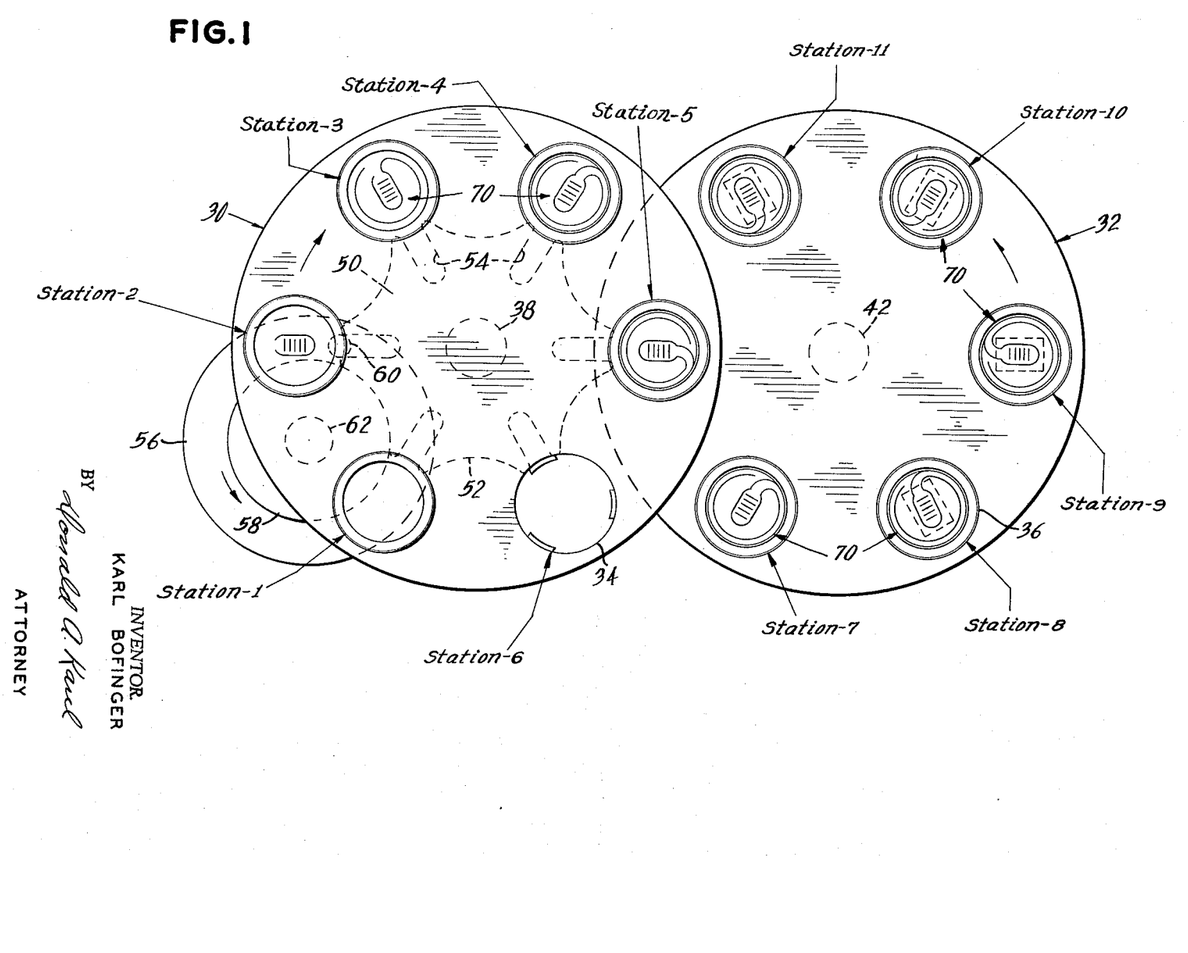
FIG. 1 is a plan view of the apparatus showing the location of each of the various manufacturing stations.

As a preferred or exemplary form of the invention, FIG. 1 illustrates a pair of transfer turrets 30 and 32, each having a plurality of spaced apertures or end receiving pockets 34 and 36, respectively. The upper turret 30 partially overlaps the lower turret 32, as shown, and in this region of overlap, an upper pocket 34 becomes coaxially aligned with a lower pocket 36. The turrets rotate in opposition to one another and in the view shown in FIG. 1, turret 30 rotates clockwise while turret 32 rotates counterclockwise. Each turret rotates or indexes to a series of different stations at which various operations are performed to ultimately convert an imperforate end closure or blank into a completed end with a tabbed tear strip and seal patch affixed thereto.

To facilitate understanding of the invention, each station to which the turrets index is numbered as shown in FIG. 1. An imperforate end closure or blank is fed into a pocket 34 of the upper turret 30 at station 1. At station 2 a tab is pierced out of the central portion of the blank and is beaded to provide for ease of manual gripping. At station 3 an inner score line is formed and at station 4 an outer score line is formed, both of these score lines extending into connection with the tab to thus define a tear strip which may be torn out by manually pulling the beaded tab. At station 5, the pocket 34 of the upper turret 30 is coaxially aligned over the pocket 36 in the lower turret 32, and the end closure is transferred from the upper pocket into the lower pocket. Station 6 is merely an idle station for the upper pocket. At station 7, the end is heated and at station 8, a patch of tape or other sealing material is applied beneath the pierced-out tab. At station 9 the taped end is heated and at station 10 a bumping pressure is applied to seal the tape patch firmly to the end. This completes the manufacturing operation and at station 11 the completed end is released or ejected. The operations which occur at the various stations of FIG. 1 are only illustrative and are by no means limiting. Thus, both score lines could be scored at one station if desired and additional conventional steps, such as putting a strengthening bead into the end, can be performed without departing from the scope of the invention.

Figure 2:
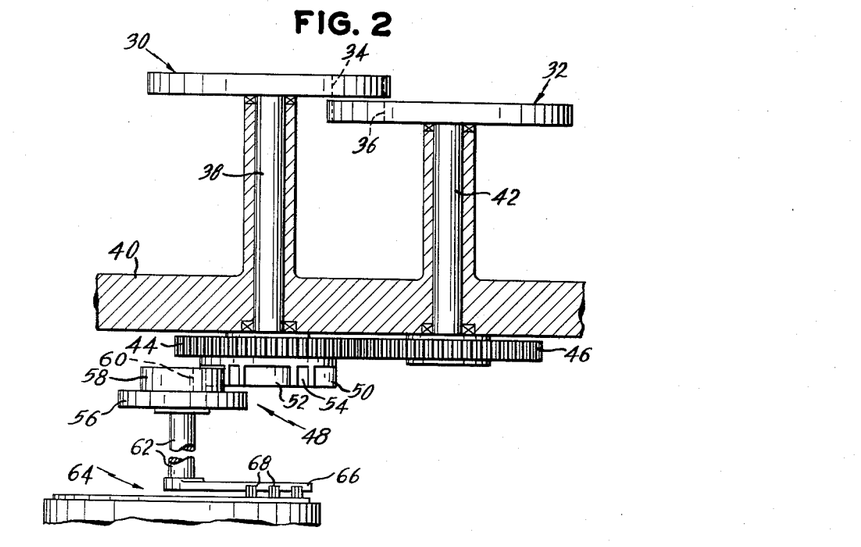
FIG. 2 is a side elevational view, partly in section, of the apparatus of FIG. 1.

Referring now to the details of the present invention, FIG. 2. illustrates a drive means which is used to index the turrets 30 and 32 to the various stations. The turret 30 is affixed to a shaft 38 which is mounted in a suitable frame 40. A similar shaft 42 is mounted within the frame 40 and is affixed to the turret 32. A pair of meshing spur gears 44 and 46 are connected respectively to the shafts 38 and 42 for the purpose of intermittently rotating said shafts and then associated turrets in opposition to one another. This intermittent rotation is effected by a Geneva drive mechanism generally designated 48.

The Geneva drive 48 includes a star wheel 50 having a plurality of spaced concave surfaces 52 interconnected by slots 54. The star wheel is turned by a drive wheel 56 which includes a follower 58 and a driving pin 60. A motor driven shaft 62 rotates the drive wheel 56 and causes the driving pin to enter a slot 54 and move the star wheel 50 through an incremental rotation which corresponds to the distance between successive stations. When the driving pin leaves the slot 54, the star wheel 50, and the turrets 30 and 32, remain stationary until the driving pin 60 enters the next adjacent slot 54. During this stationary period, the manufacturing steps at the various stations are performed. The timing cycle for performing the various manufacturing steps is controlled by a commutator or distributor means generally designated 64 which is operated by a rotary arm 66 having a plurality of brushes 68 thereon. Movement of the rotary arm 66 is effected by the drive shaft 62 and will be described in greater detail subsequently in connection with FIG. 19.

Figure 3:
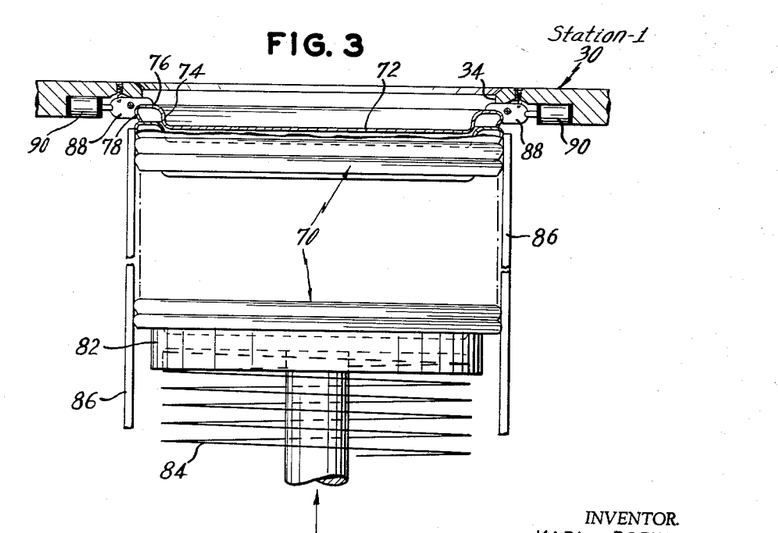
FIG. 3 is an enlarged fragmentary view showing the end feeding mechanism at station 1.
Figures 4A, 4B, 4C, 5, 6:
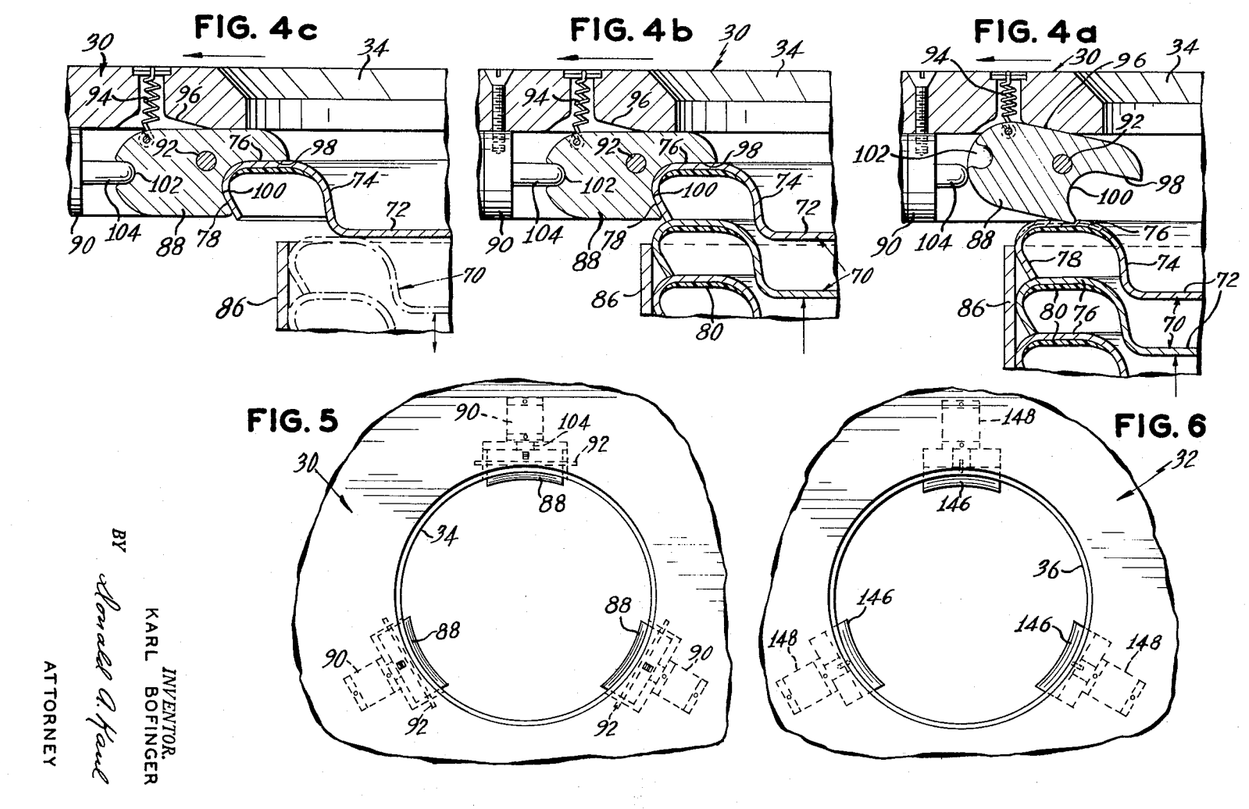
FIGS. 4a, 4b and 4c are progressive enlarged fragmentary views showing in detail how an end is fed into the jaws of the upper turret at station 1.
FIG. 5 is a fragmentary plan view of one of the upper turret pockets showing the orientation of the end retaining jaws.
FIG. 6 is a fragmentary plan view of one of the lower turret pockets showing the orientation of the end retaining jaws.

Blank end closures generally designated 70 are introduced into the turret 30 at station 1, as shown in FIGS. 3 and 4. Each end 70 is comprised of a depressed planar central panel 72 which is connected by a merging peripheral side wall 74 with a substantially flat upper rim 76 which in turn merges arcuately into a downward and inward skirt 78. End seam sealing compound 80 can be provided beneath the rim 76. The ends 70 are stacked upon a platform 82 which moves progressively upward under the influence of a compensated load leveling compression spring 84. Guides 86 maintain the ends 70 in properly stacked relation. The platform 80 is located beneath the turret 30 in alignment with the pockets or apertures 34 located therein. Each pocket 34 is provided with a plurality of pivotally mounted spring-biased jaws 88 which are controlled by normally de-energized, spring-biased solenoids 90, as seen in greater detail in FIG. 4.

As can be seen in FIG. 4a, each jaw 88 is pivotally mounted about a pivot pin 92 and is normally biased upward by a tension spring 94 affixed to the turret 30. Upward bias of the jaw 88 is limited by a cam surface 96 on the lower face of the turret 30. The inner or gripping surface of the jaw 88 includes a flat portion 98 and an arcuate portion 100, the latter having a curvature corresponding substantially to the arcuate curvature between the rim 76 and the skirt 78 of an end 70. The outer end of the jaw 88 has a depression 102 into which the end of a plunger 104 from the solenoid 90 can enter.

As the turret 30 rotates into its station 1 position, the ends 70 are biased upward by the spring-urged platform 82, but they engage the lower surface of the jaws 88 and are thus retained within the guide means 86, as seen in FIG. 4a. When the turret pocket 34 is exactly aligned over the platform, as seen in FIG. 4b, the uppermost end 70 is pushed up into the jaws with its rim 76 engaging the jaw portion 98 and its arcuate portion where the rim merges into the skirt 78 engaging the jaw portion 100. The upward bias pressure of the platform 82 overcomes the bias of the jaw spring 94 and causes the jaw to pivot to a generally horizontal position, as shown. At this time the spring biasing of the solenoid 90 causes the plunger 104 to snap into the jaw depression 102 to thus locking the jaw in its horizontal position. As the turret 30 starts to rotate again, as shown in FIG. 4c, the jaw-engaged closure 70 causes the next succeeding closure to be depressed slightly, thus maintaining it within the guide means 86 and ensuring that only a single end will be introduced into each pocket. An exemplary orientation of the jaws 88 is shown in FIG. 5 wherein three equally spaced jaws are illustrated.

Figure 7:
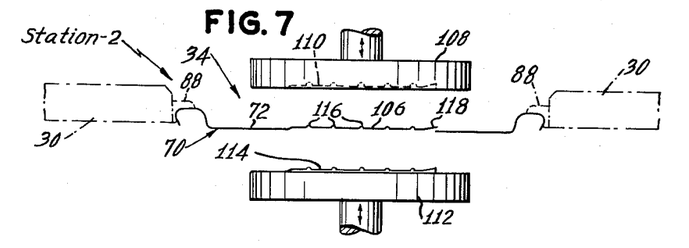
FIG. 7 is a fragmentary diagrammatic view showing the manufacturing step which occurs at station 2.
Figure 16:
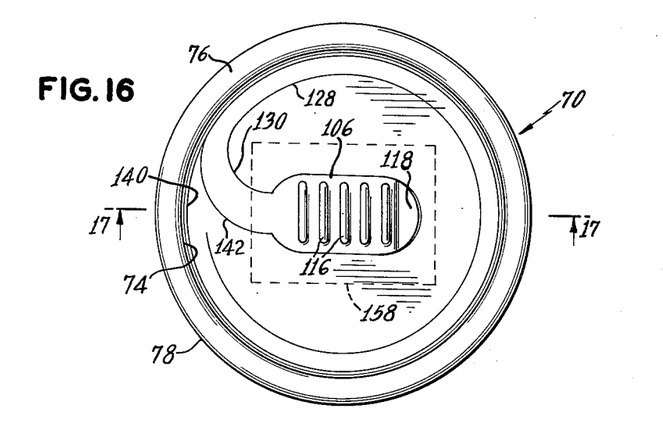
FIG. 16 is a plan view of the completed end.

When the pocket 34 containing an end blank 70 is indexed to station 2, a tab or appendage 106 is pierced out of the central panel 72 of the end. The piercing operation itself is illustrated in FIG. 7, but the resultant tab is shown in FIGS. 1 and 16. The tab 106 is pierced by means of a pair of interacting reciprocatory dies which can be selectively actuated to enter the pocket 34 of the turret 30 and to engage the upper and lower surfaces of the central panel 72 of the end 70 which is retained within the pocket. The upper die 108 is provided with a shallow cavity 110 having a plurality of linear recesses therein. The lower die 112 is provided with a punch 114 having a plurality of ridges thereon adapted to mate with the recesses in the cavity 110. When the dies are actuated, the punch 114 pierces out a portion of the central panel 72 and forces it into the cavity 110. The ridges on the punch 114 deform the tab 106 as they enter the recesses in the cavity 110, and thus form a plurality of spaced ribs 116 on the tab which serve to strengthen the tab and to facilitate manual gripping thereof. One end of the punch 144 is cammed very slightly to create a slight bend 118 at the tip of the tab 106. The bent tip 118 enables the user to easily lift the tab 106. The end of the tab opposite the tip 118 is left imperforate so the tab 106 remains connected to the central panel 72. The cavity 110 in the upper die 108 is slightly larger laterally than the punch 114 on the lower die 112. Thus, as the punch pierces out the tab portion 106 and forces it into the cavity 110, the tab is cold worked so that its lateral dimensions are spread to a slightly greater width than that of the opening formed by piercing of the tab. This insures that the tab 106 cannot accidentally be pushed back through the opening beneath it thereby breaking the patch which is subsequently applied to seal the opening.

Figure 8:
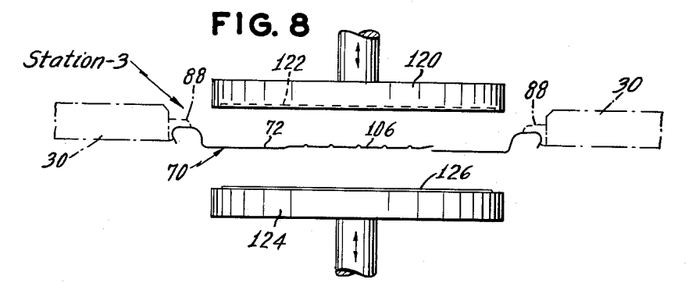
FIG. 8 is a fragmentary diagrammatic view showing the manufacturing step which occurs at station 3.

The end 70, with the tab 106 pierced therein, is next indexed to station 3 by another incremental rotation of the turret 30. As shown in FIG. 8, an upper die 120 with a cavity 122 and a lower die 124 with a punch 126 are selectively reciprocated into the pocket 34 of the turret 30 to score a line of weakness in the end 70 which will serve as the inner line of a tear strip. The line of weakness, as can best be seen in FIG. 16, is spaced inward from the peripheral wall 74 and includes a generally circular portion 128 whose ends terminate short of contact with each other and an arcuate portion 130 connecting one end of the portion 128 with one of the fixed ends of the tab 106.

Figure 9:
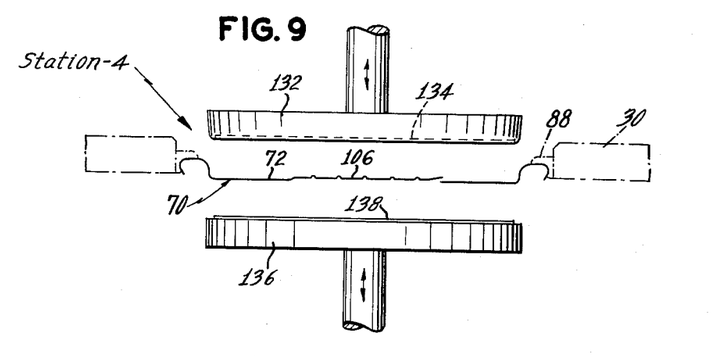
FIG. 9 is a fragmentary diagrammatic view showing the manufacturing step which occurs at station 4.

Another incremental rotation of the turret 30 indexes the end 70 to station 4 whereat, as shown in FIG. 9, an outer tear strip line is formed by selective reciprocation of an upper die 132 having a cavity 134 and a lower die 136 having a punch 138. The line of weakness scored by these dies can best be seen in FIG. 16 and includes an outer circular portion 140 completely surrounding the central panel 72 near its point of merger into the peripheral wall 74 and an arcuate portion 142 extending from the outer line 140 to the fixed end of the tab 106.

Figure 10:
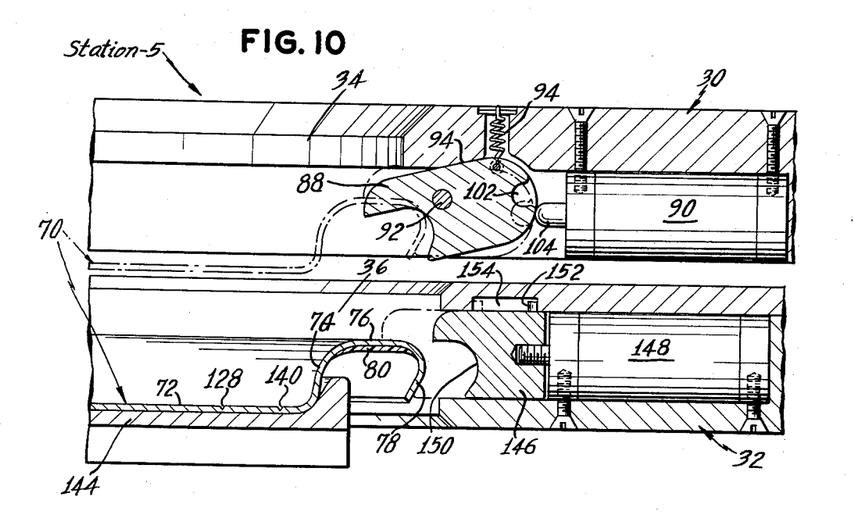
FIG. 10 is an enlarged fragmentary transverse sectional view at station 5 showing an end being transferred from the upper turret to the lower turret.

The turret 30 is next indexed to station 5 whereat, as shown in FIG. 10, the end 70 is transferred from a pocket 34 in the upper turret 30 into a pocket 36 in the lower turret 32. When the pockets 34 and 36 are coaxially aligned, a platform 144 is raised into the lower pocket 36 and the upper turret solenoids 90 are energized thus retracting the plungers 104 against the pressure of their biasing springs from the depressions 102 in the upper jaws 88. This unlocks the upper jaws 88 and allows them to pivot about the pins 92 until they contact the cammed surfaces 94, at which point the end 70 will be released from the jaws 88 and will drop onto the awaiting platform 144. The jaws 146 in the lower turret 32 are not pivotally mounted like the upper jaws 88, but rather are reciprocable. Each lower jaw 146 is mounted on the end of a plunger of a normally de-energized, spring biased solenoid 148. When the solenoids 148 are energized, as shown in FIG. 10, the jaws 146 are retracted and the end 70 is free to drop through the aperture 36 and onto the platform 144. The inner end of each jaw 146 has an arcuate engaging portion 150 corresponding in curvature to the arcuate curvature where the rim 76 of the end merges into the skirt 78 thereof. When the solenoids 148 are de-energized, the jaws 146 under impetus of a compression spring (not shown) move inwardly and grip the end 70 as it rests on the platform 144. When the platform 144 is lowered, the end 70 is mounted within the pocket 34 of the turret 32 and is free to be rotated by the turret. If desired, a pin 152 can be affixed to each jaw 146 and arranged to slide in a slot 154 in the turret 32, thus limiting the stroke of the solenoid and thereby controlling the distance traversed by the jaws 146. An exemplary orientation of the jaws 146 is shown in FIG. 6 wherein three equally spaced jaws are illustrated.

After the end 70 is released from the pocket 34 of upper turret 30, that turret indexes to an idle position at station 6 (FIG. 1,), and subsequently returns to station 1 whereat a new end 70 is received in the same manner as that described above, and the foregoing operations are repeated.

Figure 11:
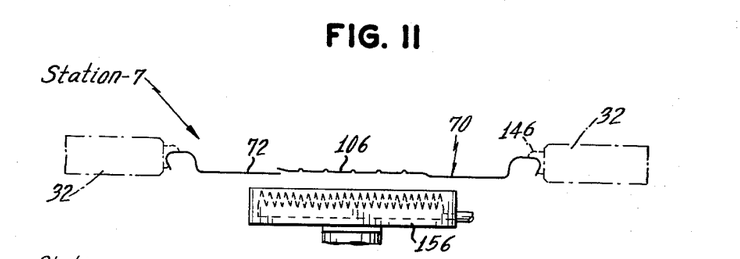
FIG. 11 is a fragmentary diagrammatic view showing the manufacturing step which occurs at station 7.

The original end 70, now retained in a pocket 36 in the lower turret 32, is indexed to station 7, as shown in FIG. 11, whereat a heating means 156, preferably electric, is actuated to heat at least the center portion of the central panel 72. While the heating means 156 may be stationary, better results can be obtained by utilizing a movable heater which can be reciprocated into close proximity to the end 70.

Figure 12:
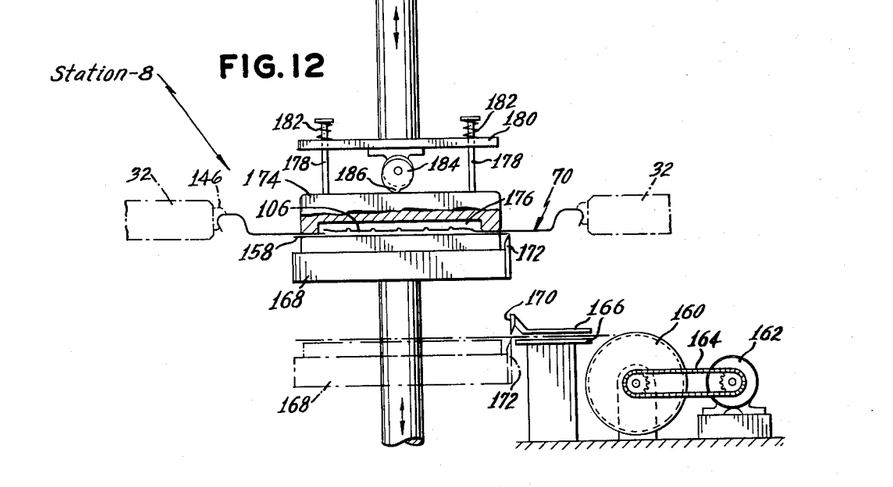
FIG. 12 is a fragmentary diagrammatic view showing the manufacturing step which occurs at station 8.

Another incremental rotation of the turret 32 indexes the end 70 to station 8 whereat a patch 158 is applied beneath the tab 106. As illustrated in FIG. 12, the patch 158 is formed of tape having an adhesive coating thereon, but it should be understood that the patch 158 may be formed from any suitable material which can be sealed to the underside of the end 70. For example, the patch could be formed from metallic foil which could be suitably affixed to the end 70 by bonding, brazing, soldering or other like operations. As illustrated, the patch 158 is severed from a roll 160 of tape which is wrapped with the adhesive side facing outward. A motor 162 rotates the tape roll 160 by means of a belt or chain drive 164 and causes the end of the tape to be fed between a pair of spaced guides 166 and onto a platform 168, shown in phantom in its lower position (FIG. 12). A fixed blade 170 is mounted on the end of the upper guide 166 and a blade 172, herein called a movable blade, is mounted on the guide side of the platform 168. The platform is reciprocable from a lower position whereat the tape is fed thereonto to an upper position whereat the tape is applied to the lower surface of an end 70. When the platform 168 is moved from its lower to its upper position, the fixed blade 170 and the movable blade 172 form a cutting couple which severs a piece of tape from the roll, the severed piece forming the patch 158 which is subsequently carried upward on the platform 168.

Simultaneously as the platform 168 moves upward, a die 174 moves downward to engage the upper surface of the end 70. The die 174 has a cavity 176 therein which accommodates the tab 106 without applying pressure thereto. The die 174 is supported by a pair of rods 178 which are slidably mounted through a platen 180 and are spaced therefrom by compression springs 182. Reciprocation of the platen 180 thus causes a corresponding reciprocation of the die 174. A motor-operated cam 184 is interposed between the platen 180 and the die 174, and this cam is operated, as will be described in greater detail in connection with FIG. 19, when the die 174 and platform 168 have been moved to the positions shown in FIG. 12; namely, in contact with the surfaces of the central panel 72 of the end 70. The cam 184 has a high spot 186 which, when rotated into contact with the top of the die 174, imparts a slight bumping pressure to the die, thus causing the patch 158 which is interposed between the end 70 and the platform 158 to become attached to the end beneath the pierced-out tab 106.

Figure 13:
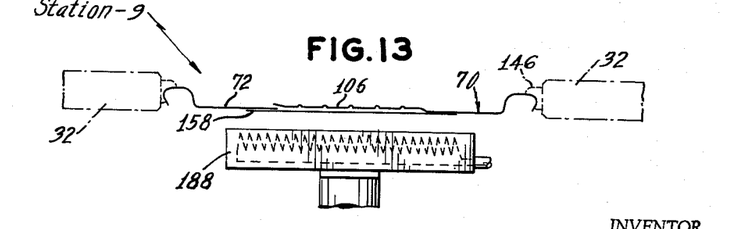
FIG. 13 is a fragmentary diagrammatic view showing the manufacturing step which occurs at station 9.
Figure 14:
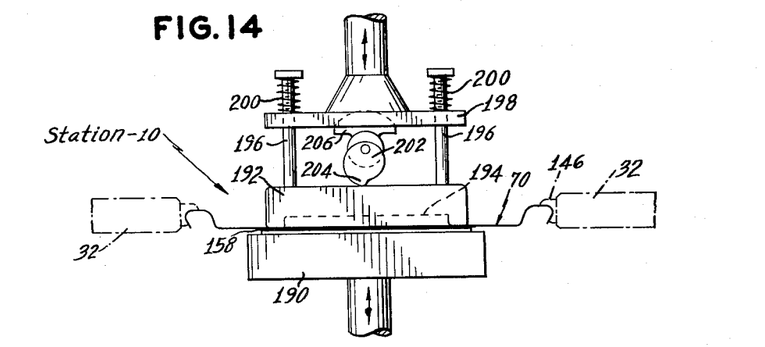
FIG. 14 is a fragmentary diagrammatic view showing the manufacturing step which occurs at station 10.

The end is then indexed to station 9, as shown in FIG. 13, whereat a heating means 188, similar to the heating means 156 of FIG. 11, heats the end with the tape patch 158 applied thereto. Subsequent incremental rotation of the turret 32 indexes the heated end to station 10, as shown in FIG. 14, whereat the patch 158 is securely attached to the undersurface of the end 70 to hermetically seal the opening formed by the pierced-out tab 106. At station 10, a lower supporting platform 190 and an upper die 192 with a tab-receiving cavity 194 therein are both reciprocated into contact with the respective surfaces of the end 70. In a manner similar to that described for FIG. 12, the upper die 192 is supported by a pair of rods 196 which are slidably mounted through a platen 198 and are spaced therefrom by compression springs 200. A motor-operated cam 202 having a high spot 204 is interposed between the die 192 and the platen 198. When the cam 202 is rotated, the high spot 204 strikes the upper face of the die 192 which in turn imparts a severe bumping pressure on the end 70, thus firmly sealing the patch 158 onto the undersurface of the end to provide a hermetic end closure. A counterweight 206 may be provided in conjunction with the cam 202 to insure a rapid and positive striking pressure by the cam high spot 204.

Figure 15:
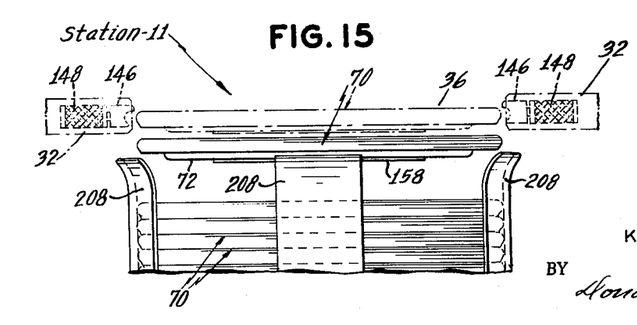
FIG. 15 is a fragmentary view showing a completely manufactured end being ejected at station 11.
Figure 17:
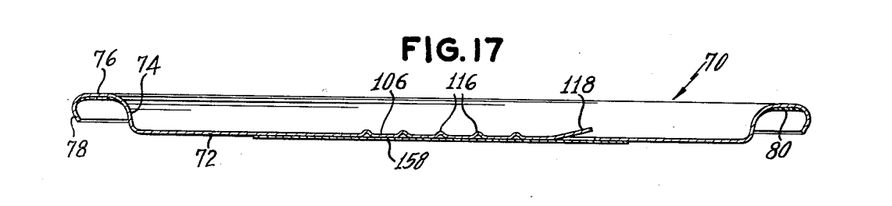
FIG. 17 is an enlarged transverse sectional view taken along line 17—17 of FIG. 16.

After the above-described severe bumping blow of station 10 is applied, the end 70 is completely manufactured. Subsequently, when the turret 32 indexes to station 11, as shown in FIG. 15, the solenoids 148 are energized to retract the jaws 146 and thus permit the finished end 70 to drop from the pocket 36 into a set of guides 208 which maintain the completed ends in stacked relationship. Subsequently, the ends may be removed from the stack and applied to containers by conventional means. A completed end 70 is shown in detail in FIGS. 16 and 17.

When such an end is applied to a container, it may be opened manually by a consumer to permit removal of the container contents. To accomplish such an opening, the consumer first inserts a finger or a fingernail under the tip 118 and pulls upward, thus lifting the tab 106 away from the patch 158. Thereafter the tab is gripped and pulled away from the container body thus causing the end to tear first along the arcuate lines of weakness 130 and 142 and then finally along the circular outer tear strip lines 128 and 140. Continued pulling causes tearing throughout the extent of the outer line 140 which in turn causes the entire central panel 72, which is circumscribed by the outer line 140, to tear away from the end. Thus, the tab, the tear strip, the patch, and the central panel are all removed completely and a circular opening having the size of the outer line 140 is provided for easy removal of the container contents.

Figure 18:
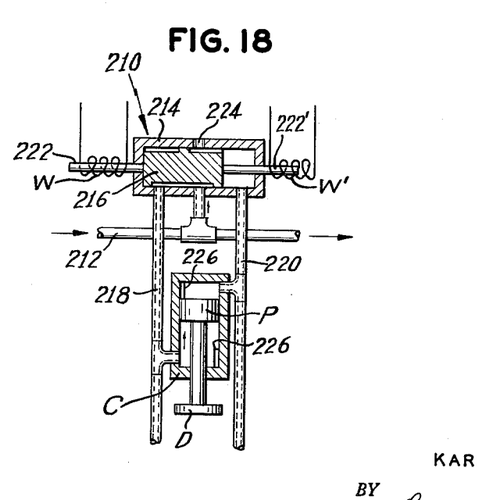
FIG. 18 is an enlarged transverse sectional view showing the construction of the control valves which control the movement of the manufacturing mechanisms of the various stations.
Figure 19:
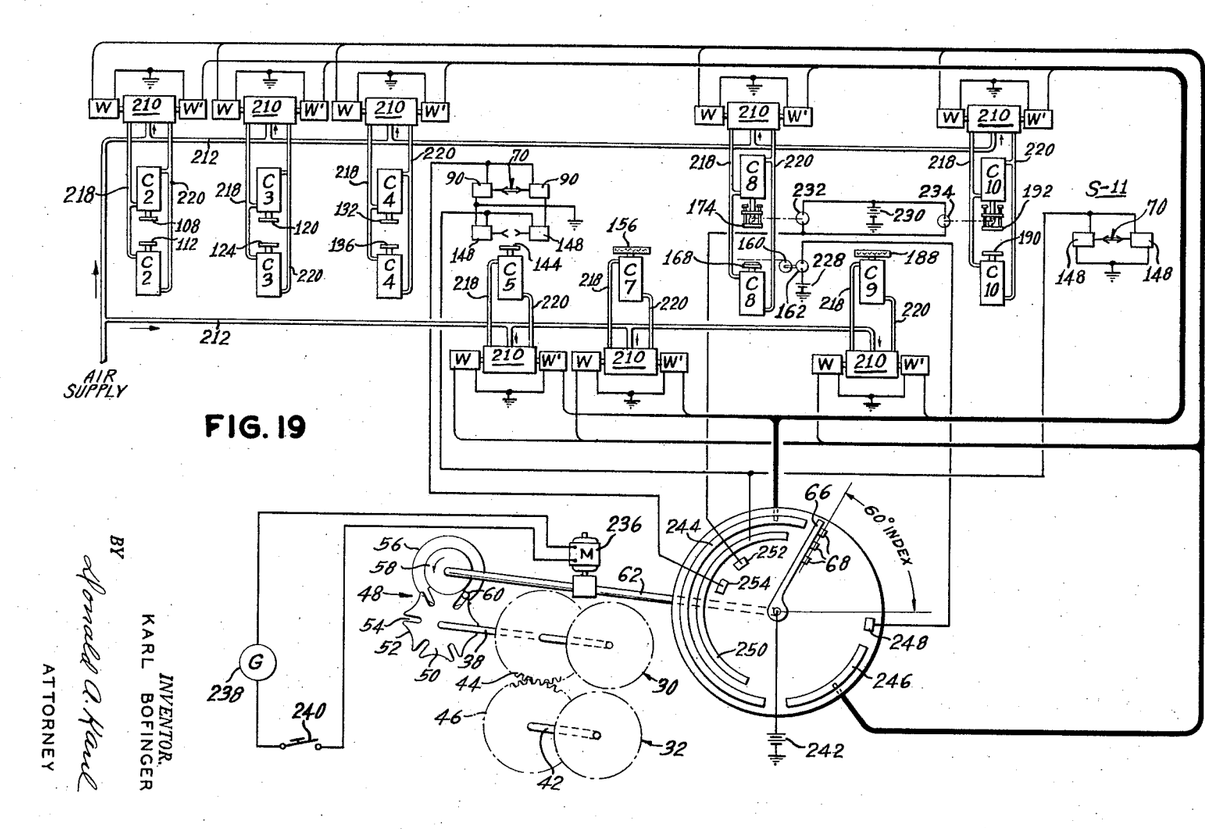
FIG. 19 is a schematic view showing the electrical and pneumatic connections for operating the apparatus.

The foregoing manufacturing steps require a suitable source of power for accomplishing the required mechanical movements. While mechanical, electrical, pneumatic or hydraulic power can be used, the illustrated apparatus utilizes pneumatic power in the form of compressed air supplied from a suitable source thereof as shown in FIG. 19. Electrically controlled valves generally designated 210 control the flow of such compressed air and direct such flow through proper piping to cause the desired reciprocatory motion of the particular dies or heater in question. FIG. 18 shows one of these valves in greater detail wherein it can be seen that the compressed air line 212 connects to the central portion of a valve body 214. A valve member 216 is slidably mounted within the valve body and is adapted to permit the compressed air from line 212 to flow either through a conduit 218 (as shown) or through a conduit 220. Movement of the valve member 216 is controlled electrically through a pair of end stems 222 and 222′ which extend from the ends of the valve member 216 and through the ends of the valve body 214 into helical electrical windings or coils W and W′ respectively. When the coil W is electrically energized and coil W′ is not, the valve stem 222 is drawn into coil W, thus moving the valve member 216 to the position shown. When the coil W′ is electrically energized and coil W is not, the valve stem 222′ is drawn into coil W′, thus moving the valve member 216 to the opposite end of the valve body 214 and permitting compressed air to flow through the conduit 220. An exhaust port 224 is provided in the central portion of the valve body 214.

The compressed air which is directed by the valve 210 into conduit 218 or 220 subsequently flows to a cylinder C wherein a piston P is slidably mounted between a pair of upper and lower stops 226. A die D is shown connected to the piston P by an elongated rod. When, as shown, the compressed air flows through the conduit 218, the piston P is forced to its retracted position in contact with the upper stop 226. If the valve member 216 were moved to the opposite position, the compressed air would flow through the conduit 220 and the piston P would be forced to its extended position in contact with the lower stop 226.

Referring to FIG. 19, it can be seen that where two dies are needed at a particular station, air through the conduit 218 serves to retract both dies and air through the conduit 220 serves to extend both dies. The cylinders at east station are numbered in accordance with that station; thus C2 are the cylinders for station 2, C3 for station 3, and so on. At station 2, compressed air through the conduit 218 causes the dies 108 and 112 to be retracted, thus permitting the turret 30 to index freely. However, when a pocket 34 with an end 70 therein is stopped at station 2, the valve 210 shifts and causes the air to flow through the conduit 220, thus extending the dies 108 and 112 into contact with the retained end 70 for the purpose of piercing out the tab 106 as was previously described. Similar operation takes place at stations 3, 4, 8 and 10, each of which has an upper and a lower die. At stations 5, 7 and 9 where only a single die is utilized, air through conduit 218 raises the die and air through conduit 220 retracts it.

A separate power supply 228 operates the tape feeding motor 162 at station 8. A separate power supply 230 operates a motor 232 which in turn operates the cam 184 and a motor 234 which in turn operates the cam 202.

An electric motor 236 provides the power for driving the turrets 30 and 32. This motor is connected in series with a generator 238 and is rendered operative by closure of a switch 240. Operation of the motor 236 drives the Geneva mechanism 48 which indexes the turrets to their various stations. In the apparatus as illustrated, six stations are provided for each turret so the angular distance between each station is 60 degrees. As mentioned previously, the rotary arm 66 is driven by the main drive shaft 62. Power is supplied to the brushes 68 on the rotary arm from a power supply means 242 which supplies electrical power for controlling the valves 210 and for controlling the solenoids 90 and 148 which in turn control the movement of the jaws in turrets 30 and 32 respectively. The outermost brush 68, when rotated, makes electrical contact with segmental commutator bars 244, 246 and 248. The middle brush makes electrical contact with a segmental commutator bar 250 and the inner brush makes electrical contact with segmental commutator bars 252 and 254.

Contact between the outer brush 68 and the commutator bar 244 transmits electrical energy to the windings W′ of the valves 210, thus causing the valves to move to a position whereat compressed air from the line 212 can flow through the conduits 220 to extend the dies and heaters. Contact between the outer brush 68 and the commutator bar 246 transmits electrical energy to the windings W of the valves 210, thus causing the valves to move to a position as shown in FIG. 18 whereat compressed air from the line 212 can flow through the conduits 218 to retract the dies and heaters. Contact between the outer brush 68 and the commutator bar 248 transmits electrical energy to the tape feeding motor 162 to cause it to feed a patch 158 from the tape roll 160 onto the platform 168. Contact between the middle brush 68 and the commutator bar 250 transmits electrical energy to the lower jaw solenoids 148 to cause the jaws 146 to open at station 5 to receive an end 70 from the upper turret 30 and to cause the jaws 146 to open at station 11 to discharge the finished end 70. Contact between the inner brush 68 and the commutator bar 252 transmits electrical energy to the cam operating motors 232 and 234 to cause them to rotate the cams 184 and 202 respectively. Contact between the inner brush 68 and the commutator bar 254 transmits electrical energy to the upper jaw solenoids 90 to cause them to unlock the upper jaws 88 at station 5 to permit an end 70 to be transferred from the upper station to the lower station and to unlock the upper jaws 88 at station 1 to render them capable of receiving an end 70. The length of each commutator bar is properly varied so contact will occur at the proper time in the cycle. As the Geneva drive wheel 56 makes one complete revolution, the rotary arm 66 likewise makes one complete revolution, and at the same time, the turrets 30 and 32 have indexed from one station to the next or a distance of sixty degrees, and have remained idle at that station long enough to accomplish the necessary manufacturing steps.

It will be apparent to those skilled in the art that the previously described apparatus does not require any particular orientation of the blank end closures as introduced and that the tab and tear strip may be satisfactorily formed in each end regardless of its rotational position within a turret pocket. Furthermore, although the illustrated apparatus has six stations for each turret, this amount may be increased, if desired, to add other conventional manufacturing steps, such as formation of a circular strengthening bead in the end, and the amount may also be decreased if it were desired to perform combined steps at one station. It may be desirable also to modify the sequence of certain of the steps, as, for example, to heat the end at two stations and then apply tape, rather than to heat the end at one station, apply tape at the next station, and then re-heat the taped end at a third station.

It is thought that the invention and many of its attendant features will be understood from the foregoing description, and it will be apparent that various changes may be made in the form, construction and arrangement of parts without departing from the spirit and scope of the invention or sacrificing all of its material advantages, the form hereinbefore described being merely a preferred embodiment thereof.

I claim:

1. Apparatus for manufacturing a manually openable end closure from an imperforate end closure blank, said apparatus comprising:
   a first supporting device having means to retain an end closure blank;
   means for forming a tear strip in said blank while it is retained in said first supporting device;
   means for severing a tab from said retained blank at one end of said tear strip to thus provide a portion which can be manually gripped and pulled to remove said tear strip;
   a second supporting device having means to retain an end closure with a tear strip and tab formed therein;
   transfer means for conveying said end closure blank, with a tear strip and tab formed therein, from said first supporting device to said second supporting device; and
   means for applying a patch across the severed portion from which said tab was formed while said end closure is retained in said second supporting device; said end closure thus again being rendered imperforate.

2. Apparatus as defined in claim 1 but further characterized by means for intermittently moving said first and second supporting devices to permit the progressive manufacture of said end closures.

3. Apparatus as defined in claim 1 wherein the means in each supporting device for retaining the end closure includes a plurality of selectively actuatable jaws.

4. Apparatus as defined in claim 1 wherein the means for applying a patch includes:
   means for severing the patch from a supply roll;
   means for moving the severed patch into contact with one surface of said end closure; and
   means for applying pressure on the other surface of said end closure to cause said patch to be sealed beneath said tab.

5. End closure manufacturing apparatus comprising:
   a pair of counter-rotating turret members, each having a plurality of spaced apertures therein for receiving end closure blanks;
   one of said turret members being positioned above and slightly overlapping the other of said turret members with an aperture in each of said turret members being in coaxial alignment in the region of overlap;
   feeding means for feeding an end closure blank into each of the apertures of said higher turret member for supporting engagement therein;
   drive means for rotating said higher turret member to successively convey an end closure blank to a plurality of upper level stations;
   scoring means at one of said upper level stations for forming in said end closure blank a pair of spaced score lines defining therebetween a tear strip;
   piercing means at another of said upper level stations for severing a part of said end closure blank adjacent one end of said tear strip to form a manually engageable tab member;
   transfer means at another of said upper level stations for transferring said end closure blank from an aperture in the higher turret member to an axially aligned aperture in the lower turret member;
   said drive means also rotating said lower turret member to successively convey said end closure blank to a plurality of lower level stations;
   taping means at one of said lower level stations for applying a segment of tape across the opening formed by the severance of said tab member; and
   pressurizing means at another of said lower level stations for applying a pressure to said end closure blank to seal said tape segment firmly thereagainst, thus producing a finished end closure.

6. Apparatus as defined in claim 5 but further characterized by a plurality of jaws located within each upper and lower turret aperture for maintaining an end closure in supported engagement within said apertures.

7. Apparatus as defined in claim 5 wherein said drive means is an intermittent rotary drive which indexes each turret to a station, idles at said station to permit manufacturing operations to be carried out thereat, and then indexes to the next adjacent station.

8. Apparatus as defined in claim 5 wherein said taping means includes:
   a supply roll of tape;
   a movable platform mounted beneath an aperture in said lower turret member;
   means for feeding tape from the end of said supply roll onto said platform;
   means for severing the tape on said platform from said supply roll, thus leaving a platform supported tape segments; and
   means for moving said platform into contact with the lower surface of a turret mounted end closure for applying said tape segment across the opening formed by the severance of said tab member.

9. Apparatus as defined in claim 8 wherein the means for severing the tape includes a fixed blade mounted above and beside said platform and a movable blade mounted on one edge of said platform whereby when said platform is moved upward, said fixed and movable blades will interact to sever the tape passing therebetween.

10. Apparatus as defined in claim 5 wherein the pressurizing means includes a movable die which is brought into contact with the surface of the end closure opposite of that surface to which the tape segment is applied.

11. Apparatus as defined in claim 19 but further characterized by a cam adapted to impart a force on said movable die which in turn transmits that force to said end closure.

12. Apparatus for manufacturing an end closure of the type having an integral tear strip, an appendage attached to said tear strip and formed by piercing a portion of said end closure, and an adhesive material sealing the opening formed by the piercing of said end closure, said apparatus comprising:
feeding means for delivery single end closure blanks;
first turret means having at least one aperture therein for receiving a delivered end closure blank;
blank retaining means within said first turret aperture for mounting the end closure blank received therein;
driving means for rotating said first turret means through a series of upper operating stations;
scoring means at at least one of said upper stations being operative to form a pair of scored lines of weakness within said end closure blank, the area between said lines defining a tear strip;
piercing means at another of said upper stations for piercing out a portion of said end closure blank at one end of said tear strip to thus define an appendage for said tear strip;
transfer means at another of said upper stations for releasing said first turret blank retaining means and thus releasing said end closure blank;
second turret means partially underlying said first turret means and having at least one aperture therein coaxially aligned with the aperture in said first turret means and thus adapted to directly receive an end closure blank released by said transfer means;
blank retaining means within said second turret aperture for mounting the released end closure blank;
said driving means also rotating said second turret means through a series of lower operating stations;
heating means at at least one of said lower stations for heating said end closure blank;
taping means at another of said lower stations for applying a strip of adhesive material across the opening formed by the piercing of said appendage;
force applying means at another of said lower stations for applying a force to said end closure blank to firmly seal said strip to said end closure blank, thus producing a manufactured end closure; and
discharge means at another of said lower stations for releasing said manufactured end closure from said second turret means.

13. Apparatus as defined in claim 12 wherein the blank retaining means in both said first and said second turret means includes a plurality of jaws movably mounted about the peripheries of the respective turret apertures.

14. Apparatus is defined in claim 13 wherein the jaws in said first turret aperture are normally biased to an unlocked position but are pivotally mounted to be moved, upon reception of an end closure, to a lockable position.

15. Apparatus as defined in claim 14 but further characterized by a solenoid mounted adjacent to each jaw and selectively actuatable to lock said jaws in their lockable position.

16. Apparatus as defined in claim 13 wherein the jaws in said second turret aperture are selectively reciprocable between an extended or end retaining position and a retracted position.

17. Apparatus as defined in claim 16 but further characterized by a solenoid mounted adjacent each to each jaw and selectively actuatable to reciprocate said jaws.

18. Apparatus as defined in claim 12 wherein said driving means includes a means for producing intermittent rotary motion to thus index each turret to a station, allow it to idle thereat, and then index to the next adjacent station.

19. Apparatus as defined in claim 12 wherein said taping means includes:
a supply of adhesive material;
a reciprocable platform;
means for feeding adhesive material from said supply onto said platform;
means for severing the material on said platform from said supply thus leaving a strip on said platform; and
means for reciprocating said platform to bring said strip into contact with a turret retained end closure blank for applying said strip across the opening formed by piercing of said appendage.

20. Apparatus as defined in claim 19 wherein the means for severing said strip from said supply includes a first blade adjacent said platform and a second blade on said platform with the material from said supply running between said first and second blades, whereby when said platform is reciprocated, said blades will interact to sever said material.

21. Apparatus as defined in claim 12 wherein said force applying means includes a reciprocable die adapted to be moved into contact with said end closure blank.

22. Apparatus as defined in claim 21 but further characterized by a movable cam member mounted adjacent said die and being operative to impart a force to said die which in turn imparts the force to said end closure blank to seal the strip thereto.

23. In an apparatus of the character described for producing an end member having an integral tear strip, a punched out tab member providing a handle for said tear strip, and a tape segment sealing the opening formed by punching out said tab member; taping means for producing said tape segment comprising:
a platform having a blade member affixed to one end thereof;
a fixed blade member in elevated juxtaposition to said platform blade member;
a source of tape in the form of a web;
means for feeding tape from the end of said web beneath said fixed blade member and onto said platform; and
means for elevating said platform past said fixed blade member whereby coaction between said fixed and said platform blade members severs a segment of tape.

24. In a machine of the type described for producing manufactured end members, conveying means comprising:
a pair of counter-rotating turret members each having at lease one aperture therein;
said turret members peripherally overlapping in a small region which defines a transfer region;
means for rotating said turret members in opposition and for temporarily terminating said rotation to effect transfer;
said apertures being coaxially aligned in overlapping coincidence in said transfer region when said turret rotation is temporarily terminated;
mounting means within the aperture in each turret member operable to mount an end member within the aperture; and
means at said transfer region for releasing the mounting means in the uppermost turret member and simultaneously operating the mounting means in the lowermost turret member whereby an end member will be transferred from the uppermost turret member to the lowermost one.

25. In a machine as defined in claim 24, said mounting means including a plurality of jaws in both the upper and the lower turret apertures, said jaws having a contoured gripping surface for engaging the periphery of an end member.

26. In a machine as defined in claim 25, said upper turret jaws being pivotally mounted and normally biased, but being operative to move to an unbiased position upon reception of an end member.

27. In a machine as defined in claim 26, said upper turret mounting means being further characterized by a solenoid mounted adjacent each jaw and being selectively operable to lock said jaws in their unbiased position.

References Cited by the Examiner
UNITED STATES PATENTS

| | | | |
|---|---|---|---|
| 3,089,609 | 5/1963 | D'Andrea | 220—48 |
| 3,151,766 | 10/1964 | Henchert | 220—54 |

CHARLES W. LANHAM, *Primary Examiner.*

R. D. GREFE, *Assistant Examiner.*